(Model.)

C. W. SLEEPER.
CARRYING WHEEL.

No. 398,664. Patented Feb. 26, 1889.

Witnesses.
Geo. S. Robinson
A. O. Dechene

Inventor.
Charles W. Sleeper

UNITED STATES PATENT OFFICE.

CHARLES W. SLEEPER, OF ISLAND POND, VERMONT.

CARRYING-WHEEL.

SPECIFICATION forming part of Letters Patent No. 398,664, dated February 26, 1889.

Application filed April 17, 1888. Serial No. 270,996. (Model.)

*To all whom it may concern:*

Be it known that I, CHARLES W. SLEEPER, a citizen of the United States, residing at Island Pond, in the county of Essex and State of Vermont, have invented a new and useful Carrying-Wheel, of which the following is a specification.

My invention relates to improvements in the carrying mechanism of "seaming-machines," (machines for forming and soldering the bodies of tin cans,) in which a forming device receives the can-body, cut to size, and carries it through a series of operations—viz., receiving and forming the body, applying flux and solder, soldering, and discharging the finished body from the forming device. During these operations it is necessary that the forming device should move by an intermittent motion to various positions upon the machine and stop at each position to allow a certain part of the work to be performed upon the can-body which it carries. It is also necessary that the can-body shall maintain the same position throughout in relation to the horizon, as the application of the solder, flux, and soldering-irons must be to the upper side of the can-body.

The object of my invention is to provide means by which any suitable forming device may be carried, (by continuous or intermittent motion,) about a horizontal shaft without changing its position in relation to the horizon.

I attain this object by means of the mechanism illustrated in the accompanying drawings, in which—

Figure 1:
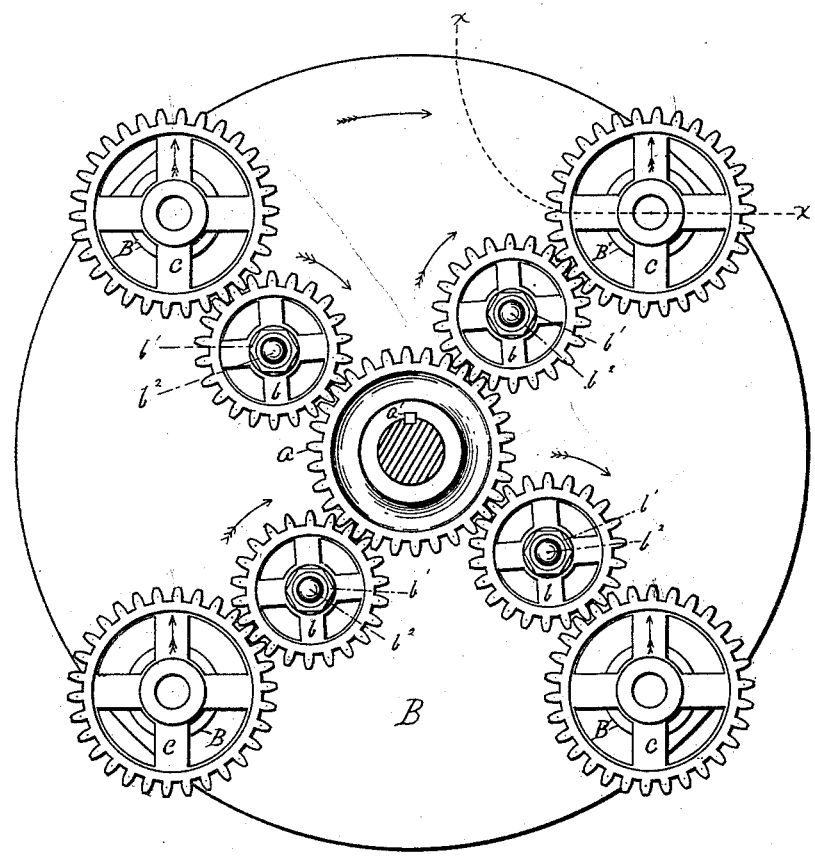
Figure 2:
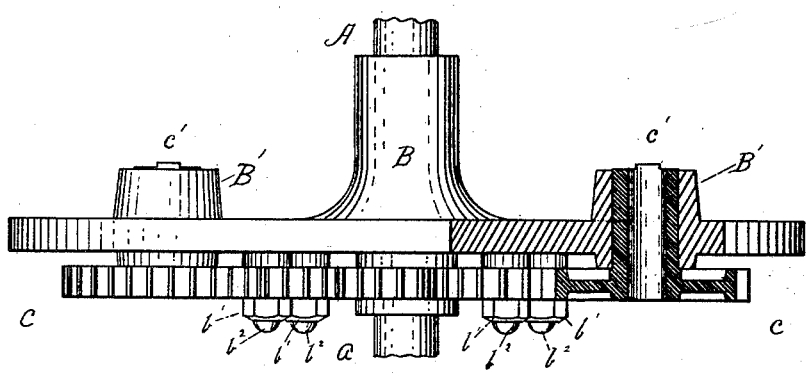

Figure 1 is an elevation showing the arrangement of the gears. Fig. 2 is a top view of the same, showing, also, a section taken at the line $x\ x$.

The shaft A will be held securely to the machine to which it is to be applied by any suitable clamps or boxes and will not be allowed to revolve. The gear $a$ is firmly secured to the shaft A by the key $a'$. The wheel or flange B is fitted loosely to the shaft A, so that it may revolve freely upon it. Projecting from the wheel or flange B are hubs B' B' B' B', placed at equal distances from the shaft A and bored to receive the hubs of the gears $c\ c\ c\ c$. The said gears are of the same pitch and diameter as the stationary gear $a$.

Intermediate gears, $b\ b\ b\ b$, are placed in such position that they may each engage with the gear $a$ and at the same time may each engage with one of the gears $c\ c\ c\ c$, and are held in position by the nuts $b'\ b'\ b'\ b'$ and the studs $b^2\ b^2\ b^2\ b^2$. The hubs of the gears $c\ c\ c\ c$ are bored through their entire length for the purpose of receiving a bolt or mandrel by which the forming device will be secured to the said hubs. Projections $c'\ c'$, Fig. 2, are provided for holding the said forming device in position by fitting into a proper recess to be made in the said forming device. When the wheel or flange B is made to revolve in the direction indicated by the arrows, Fig. 1, the intermediate gears, $b\ b\ b\ b$, are carried about the gear $a$, and revolve upon the studs $b^2\ b^2\ b^2\ b^2$ in the same direction with the wheel or flange B, as shown by the arrows. The gears $b\ b\ b\ b$, engaging with the gears $c\ c\ c\ c$, impart a motion to them sufficient to counteract the involuntary revolution about their axes which they would otherwise make, the effect of which is that the gears $c\ c\ c\ c$ are prevented from changing their position in relation to the horizon, simply making a revolution about the shaft A without making a revolution about their axes.

Any work secured to the hubs of gears $c\ c\ c\ c$ will maintain the same position in relation to the horizon throughout the complete revolution.

I do not claim any special mechanism for rotating the wheel or flange B, as such mechanism must vary with its application to different machines; neither do I restrict myself to an arbitrary number of gears.

What I claim as my invention, and desire to secure by Letters Patent, is—

The combination, in a carrying-wheel for seaming-machines, of the stationary gear $a$, the wheel or flange B, the intermediate gears, $b\ b\ b\ b$, and the gears $c\ c\ c\ c$, substantially as described, and for the purpose set forth.

CHARLES W. SLEEPER.

Witnesses:
   GEO. S. ROBINSON,
   A. O. DECHENE.